(12) United States Patent
McPherson et al.

(10) Patent No.: US 11,663,177 B2
(45) Date of Patent: May 30, 2023

(54) SYSTEMS AND METHODS FOR EXTRACTING DATA IN COLUMN-BASED NOT ONLY STRUCTURED QUERY LANGUAGE (NOSQL) DATABASES

(71) Applicant: International Business Machines Corporation, Armonk, NY (US)

(72) Inventors: Jacob McPherson, Franklinton, NC (US); David Leo Rocker, Rougemont, NC (US); Chintan Rajyaguru, Cary, NC (US); Willie Robert Patten, Jr., Hurdle Mills, NC (US)

(73) Assignee: International Business Machines Corporation, Armonk, NY (US)

( * ) Notice: Subject to any disclaimer, the term of this patent is extended or adjusted under 35 U.S.C. 154(b) by 153 days.

(21) Appl. No.: 16/865,581

(22) Filed: May 4, 2020

(65) Prior Publication Data

US 2021/0342316 A1  Nov. 4, 2021

(51) Int. Cl.
| | | |
|---|---|---|
| *G06F 16/21* | (2019.01) | |
| *G06F 16/22* | (2019.01) | |
| *G06F 16/182* | (2019.01) | |
| *G06F 16/23* | (2019.01) | |

(52) U.S. Cl.
CPC .......... *G06F 16/214* (2019.01); *G06F 16/182* (2019.01); *G06F 16/221* (2019.01); *G06F 16/2282* (2019.01); *G06F 16/2322* (2019.01)

(58) Field of Classification Search
CPC .................................................. G06F 16/214
USPC ........................................................ 707/609
See application file for complete search history.

(56) References Cited

U.S. PATENT DOCUMENTS

| | | | | |
|---|---|---|---|---|
| 9,471,711 | B2 | 10/2016 | Abadi et al. | |
| 2014/0172833 | A1* | 6/2014 | Taylor | G06F 16/24534 707/722 |
| 2014/0181141 | A1* | 6/2014 | Sowell | G06F 16/901 707/769 |
| 2014/0214897 | A1* | 7/2014 | Zhu | G06F 16/2455 707/771 |
| 2015/0154259 | A1* | 6/2015 | Keeton | G06F 16/2282 707/769 |

(Continued)

FOREIGN PATENT DOCUMENTS

| | | |
|---|---|---|
| CN | 106326381 A | 1/2017 |
| CN | 109299177 A | 2/2019 |
| CN | 110990472 A | 4/2020 |

*Primary Examiner* — Muluemebet Gurmu
(74) *Attorney, Agent, or Firm* — Scully, Scott, Murphy & Presser, P.C.

(57) ABSTRACT

A method and/or system of extracting a table having data in a plurality of rows from a Not Only Structured Query Language (NoSQL) database to a different type of database that includes: scanning all the rows in a desired table in the NoSQL database and producing a list of column families and associated column names; creating a schema for a new table having a table catalog of new column names using a Java Script Object Notation (JSON) structure to extract the columns names from the list of column families; reading and extracting at least a portion of the data from the desired table in the NoSQL database into the new table having the table catalog of new columns names; associating a creation timestamp with the new table; and saving the new table having the table catalog of new column names to the different database.

20 Claims, 5 Drawing Sheets

(56) References Cited

U.S. PATENT DOCUMENTS

2016/0224594 A1    8/2016  Chow et al.
2018/0096001 A1    4/2018  Soza
2018/0260420 A1*  9/2018  Jiao .................... G06F 16/2246

* cited by examiner

SYSTEMS AND METHODS FOR EXTRACTING DATA IN COLUMN-BASED NOT ONLY STRUCTURED QUERY LANGUAGE (NOSQL) DATABASES

BACKGROUND

This disclosure relates generally to improved data management and processing for databases, including extracting of data from databases in alternative formats. More specifically, the present disclosure relates to a system and method for extracting data and metadata, preferably from large data collections, in computerized environments typically in an alternative, different format for analytical processing.

The use of electronic data storage is widespread. The relatively rapid increase in the amount of electronic data being created requires the storage and management of a large volume of electronic data. Large computer systems and network storage allow users to store and process large collections of data. Users and organizations that deal with significant quantities of digital information often have difficulty managing, searching, processing, and analyzing data in an efficient and intuitive manner. An inability to easily store, organize, search, locate, and mange data can translate into significant inefficiencies and lost opportunities.

In order to make good use of data, data needs to be efficiently retrieved and sorted for processing. A number of different types of data storage systems can be used in data processing and storage systems for storing, sorting, organizing, managing, searching, and locating data. One type of database storage system that has evolved is relational database systems. The architecture behind relational database systems is that data is organized in a highly structured manner following the relationship model. Data access and retrieval can be accomplished through searches. Searches can be performed through queries issued by users and/or software programs. Queries can be written through a variety of computing languages. One example of a computing language is Structured Query Language (SQL). SQL queries allow the user to describe the desired data and in response a Relational Database Management System (RDBMS) performs the searching to produce the desired data. The data in a relational database system is organized in a highly-structured manner following the relationship model. Data is uploaded and organized according to a well defined schema. The precise organization of the data in a relational database system keeps the data well-organized and searchable; however, the well-structured organization of the data becomes a substantial burden on large datasets resulting in declining performance on large volumes of data.

Unlike relational databases that are highly structured, Not Only Structured Query Language databases, also referred to as "Not Only SQL" or "NoSQL" databases, are unstructured in nature and provide an ability to flexibly load, store, and access data without having to define a schema ahead of time. Removing this up-front data management effort provides flexibility and permits applications to run without having to consider data dependencies and relationships. NoSQL databases work well in distributed databases where unstructured data may be stored across multiple processing nodes, and often across multiple servers. This distributed architecture allows NoSQL databases to be horizontally scalable and has been a solution to handling some of the largest database systems. The proliferation of network computing and NoSQL databases has resulted in an increasingly large amount of data being stored as incompletely structured data using, for example, "Java Script Object Notation" or "JSON", instead of traditional relational models. One problem with NoSQL databases is the data is not very useful in the format that it is stored, and requires heavy and costly operations to massage the data into a format that is easy to use and analyze.

There are generally four big NoSQL database types, key-value store, document store, column-oriented database, and graph database. In a column-based or column-oriented NoSQL database, data is stored in cells grouped in columns of data rather than as rows of data. HBase is an example of a column-oriented NoSQL distributed database. Column-based NoSQL databases, like HBase, have the problem that the data is not very useful in the format that it is available and requires heavy and costly operations to massage the data into a format that is easy to analyze. For example, efficiently extracting the column-oriented rows of data to a more traditional format useful to other types of storage or programs (SQL database, flat files (e.g., .csv, .orc, .parquet), pandas DataFrames, Spark DataFrames) is difficult, time-consuming, and costly. For example, there are programs and applications for data analysis, but those programs for example have SQL interfaces that have difficulty, or incompatibility problems, with the NoSQL data format, or if the programs or applications provide a SQL interface, they require a user to create a schema before the data can be analyzed. One problem with column-oriented NoSQL databases is that the number of columns that are contained in the column-oriented NoSQL database is unknown since each row can have a different number or different set of columns than the previous row.

SUMMARY

The summary of the disclosure is given to aid understanding of data storage or information handling systems, their architectural structures, and their methods of storing, organizing, managing, searching, and/or extracting data and metadata residing on data storage systems, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the data storage or information handling systems, their architectural structures, and their methods of operation to achieve different effects.

Methods, techniques, processes, systems, programming instructions, media containing program instructions, and/or platforms are disclosed for storing, managing, and processing electronic data. In one or more embodiments, methods, processes, computer program products, systems and/or techniques of extracting a table having data in a plurality of rows from a Not Only Structured Query Language (NoSQL) database, preferably a column-oriented NoSQL database, to a different type of database are disclosed. In one or more embodiments, the methods, processes, computer program products, systems, and/or techniques include: scanning all the rows in a desired table in the NoSQL database and producing a list of column families and associated column names; creating a schema for a new table having a table catalog of new column names using a Java Script Object Notation (JSON) structure to extract the columns names from the list of column families; reading and extracting at least a portion of the data from the desired table in the NoSQL database into the new table having the table catalog of new columns names; associating a creation timestamp with the new table; and saving the new table having the table catalog of new column names to the different database. In an aspect, scanning all the rows in a desired table and producing a list of family names and associated column names includes: scanning a first subset of the rows in the desired table in the NoSQL database; producing a list of column families and associated column names from the scanned subset of rows; checking if all the rows in the desired table have been scanned; and in response to all the rows in the desired table not being scanned, scanning a second subset of the rows in the desired table in the NoSQL database. In an embodiment, further applying a filter during scanning of the second subset of the rows in the desired table to avoid scanning any column names already scanned.

The method, process, computer program product, system, and/or technique preferably further includes checking if a previous extract of the desired table is present in the different database, and in response to a previous extract of the desired table not being present in the different database, reading and extracting all the data from the desired table in the NoSQL database into the new table having the table catalog of new columns names. The method, process, computer program product, system and/or technique, in an aspect further includes: in response to a previous extract of the desired table being present in the different database, determining whether the timestamp associated with the precious extract of the desired table is available; in response to the timestamp associated with the previous extract of the desired table not being available, reading and extracting all the data from the desired table in the NoSQL database into the new table having the table catalog of new columns names; and in response to the timestamp associated with the previous extract of the desired table being available, reading and extracting all the data after the timestamp from the desired table in the NoSQL database into the new table having the table catalog of new columns names. In an aspect, the method and system further include merging the data extracted from the NoSQL database after the timestamp with the previous extract of the desired table to add new rows and update existing rows from the previous extract; and updating the timestamp associated with the new table having the merged data and saving the new table with the merged data to the different database.

The computer program product in one or more embodiments includes a machine readable medium storing instructions that, when executed by at least one programmable processor, cause the at least one programmable processor to perform the recited and disclosed operations. The system in one or more embodiments includes at least one programmable processor; a NoSQL database, preferably a column-oriented NoSQL database, that in an aspect includes a plurality of tables storing data, each table having one or more rows, wherein each row has a row key, and one or more column families, each column family having one or more column names wherein each column name is associated with stored data where the stored data in each column name has a timestamp associated with the stored data; at least one alternative storage database comprising flat files; a machine-readable medium storing instructions that, when executed by the at least one programmable processor, cause the at least one programmable processor to perform disclosed operations to extract a table from the NoSQL database.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

The various aspects, features and embodiments of data storage or information handling systems, their architectures, and/or the processing, storing, organizing, managing, extracting, and/or searching for data in data storage or information handling systems, will be better understood when read in conjunction with the figures provided. Embodiments are provided in the figures for the purpose of illustrating aspects, features, and/or various embodiments of the data storage or information handling systems, their architectural structures, and/or the processing, storing, organizing, managing, extracting, and/or searching for data in data storage systems or databases, but the claims should not be limited to the precise arrangement, structures, features, aspects, assemblies, subassemblies, systems, circuitry, embodiments, or devices shown, and the arrangements, structures, assemblies, subassemblies, features, aspects, methods, processes, circuitry, embodiments, and devices shown may be used singularly or in combination with other arrangements, structures, assemblies, subassemblies, systems, features, aspects, circuitry, embodiments, methods and devices.

DETAILED DESCRIPTION

Figure 1:
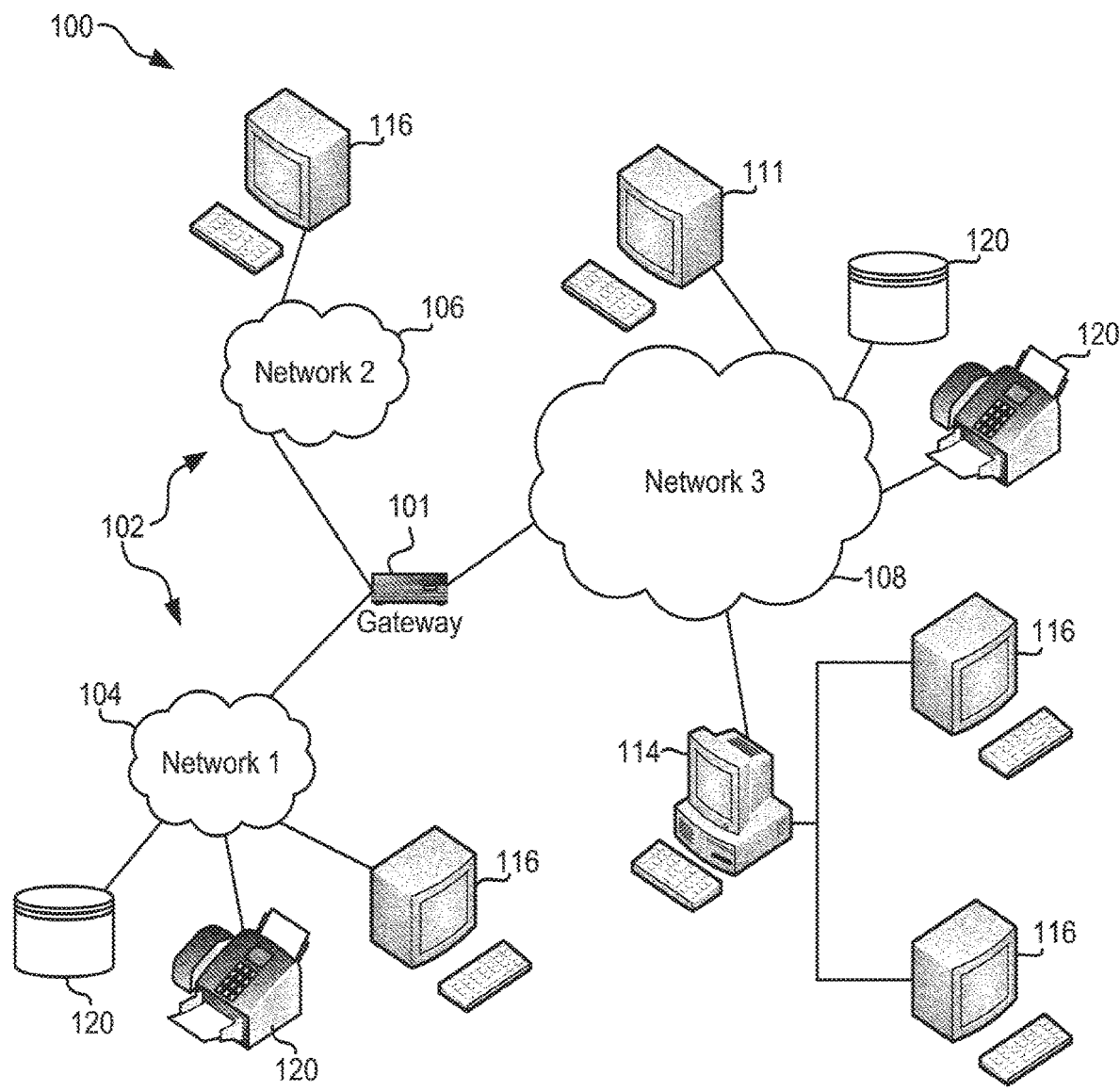
FIG. 1 depicts one example of a data processing or information handling system, also considered a computing environment, according to an embodiment of the present disclosure.

The following description is made for illustrating the general principles of the invention and is not meant to limit the inventive concepts claimed herein. In the following detailed description, numerous details are set forth in order to provide an understanding of data storage and information handling systems, their architectural structures, and/or methods of operation, including the processing, storing, organizing, managing, extracting, and/or searching for data (and metadata), however, it will be understood by those skilled in the art that different and numerous embodiments of the data storage or information handling system, its architectural structure, and/or methods of operations, including the processing, storing, organizing, managing, extracting, and/or searching for data and metadata may be practiced without those specific details, and the claims and disclosure should not be limited to the embodiments, structures, mechanisms, functional units, circuitry, assemblies, subassemblies, features, processes, methods, aspects, features or details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified, and that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "content" or "data" means any computer-readable data including, but not limited to, digital photographs, digitized analog photos, music files, video clips, text documents, interactive programs, web pages, word processing documents, computer assisted design files, blueprints, flowcharts, invoices, database reports, database records, spread sheets, charts, tables, graphs, video game assets, sound samples, transaction log files, tables, electronic documents, files which simply name other objects, and the like. Data may include structured data (e.g., database files and objects), unstructured data (e.g., documents), and/or semi-structured data.

As used herein, the term "metadata" refers to any descriptive or identifying information in computer-processable form that is associated with particular content, data, or a data set. Generally speaking, content will have metadata that is relevant to a number of characteristics of the content and/or the overall content collection, including, but not limited to, the content's technical aspects (format, bytes used, date of creation), the workflow in which the content participates (creator, owner, publisher, date of publication, copyright information, etc) and the subject matter of the content (the nature of the sound of an audio file, be it music or a sound-effect, the subject of a photograph or video clip, the abstract of a lengthy text document, excerpted particulars of invoices or other data-interchange format files). For example, metadata items may include but are not limited to one or more of the following: the content owner (e.g., the client or user that generates the content), the creation time (e.g., creation time stamp), the last modified time (e.g., timestamp of the most recent modification of data), a data set name (e.g., a file name), a data set size (e.g., number of bytes of data set), information about the content (e.g., an indication as to the existence of a particular search term), table names, column headers including column family and column name, names user-supplied or custom metadata tags, to/from information for email (e.g., an email sender, recipient, etc.), creation date, file type (e.g., format or application type), last accessed time, application type (e.g., type of application that generated the data block), location/network (e.g., a current, past or future location of the data set and network pathways to/from the data block), geographic location (e.g., GPS coordinates), frequency of change (e.g., a period in which the data set is modified), business unit (e.g., a group or department that generates, manages or is otherwise associated with the set), aging information (e.g., a schedule, such as a time period, in which the data set is migrated to secondary or long term storage), boot sectors, partition layouts, file location within a file folder directory structure, user permissions, owners, groups, access control lists (ACLS), system metadata (e.g., registry information), combinations of the same or the other similar information related to the data set. The term "metadata tag", or "metadata attributes" (also referred to as custom metadata tags or attributes) refers to any descriptive or identifying information in computer-processable form that is associated with particular metadata, and that is indicative of the actual information or the content included in various data storage systems and with which the metadata is associated. A metadata tag is also referred to as metadata attributes.

The following discussion omits or only briefly describes conventional features of data storage systems and information processing systems, data storage and management systems, their architectural structures, and/or methods of operation, including the processing, storing, organizing, managing, extracting, and/or searching for data and metadata, which are apparent to those skilled in the art. It is assumed that those skilled in the art are familiar with the general architecture of data processing and information handling systems, data storage systems, their architectural structures, and/or their methods of operations, including the processing, storing, organizing, managing, extracting, and/ or searching for data. It may be noted that a numbered element is numbered according to the figure in which the element is introduced, and is typically referred to by that number throughout succeeding figures.

In one or more embodiments, systems and/or methods for storing, organizing, sorting, managing, processing, and/or extracting collections of data are disclosed. In one or more embodiments, systems, methods, and techniques are disclosed for extracting data from a column-oriented NoSQL database to a different, more useful format, for example, a format more useful for analytic processing. In one or more embodiments, systems, methods, and techniques are disclosed to extract data from a column-oriented NoSQL database useful for other types of storage such as for example, SQL databases, flat files (.orc, .csv, .parquet), Pandas DataFrames, and/or Spark DataFrames. For example, the resulting extracted data format could be used for Spark DataFrames, Pandas DataFrames, injection into a SQL database, and readable formats such as excel spreadsheets or any other application that leverages data in the named column structure format. In an embodiment, the system and/or method dynamically collects the schema associated with the column-oriented NoSQL database and/or dynamically creates schema for the column-based NoSQL data. In an example, the disclosed systems and/or methods extracts a full table from the column-based NoSQL database for analytic processing, extracts a full table from HBase, and/or extracts a full table from NoSQL database (for example HBase) to Spark DataFrames for analytic processing.

In one or more embodiments, systems and/or methods are disclosed for collecting updated and/or new rows from the column-based NoSQL database, and in an aspect, collecting updated and/or new rows without extracting the whole table from the NoSQL database. In this regard, the number of columns per row can vary in a column-based NoSQL database, and so updates can include adding new columns and/or adding new data to existing columns. In an embodiment, the system and/or methods can track the last data extract via timestamps saved in metadata so on future analytical runs only new or updated records are extracted.

Turning to the environments in which the system, methods, and techniques have potential application, FIG. 1 illustrates architecture 100 of a data processing or information handling system, also referred to as a computer network system, in accordance with an embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer, smartphone, or any other type of logic device. It should be noted that in an embodiment a user device 111 may also be directly coupled to any of the networks.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
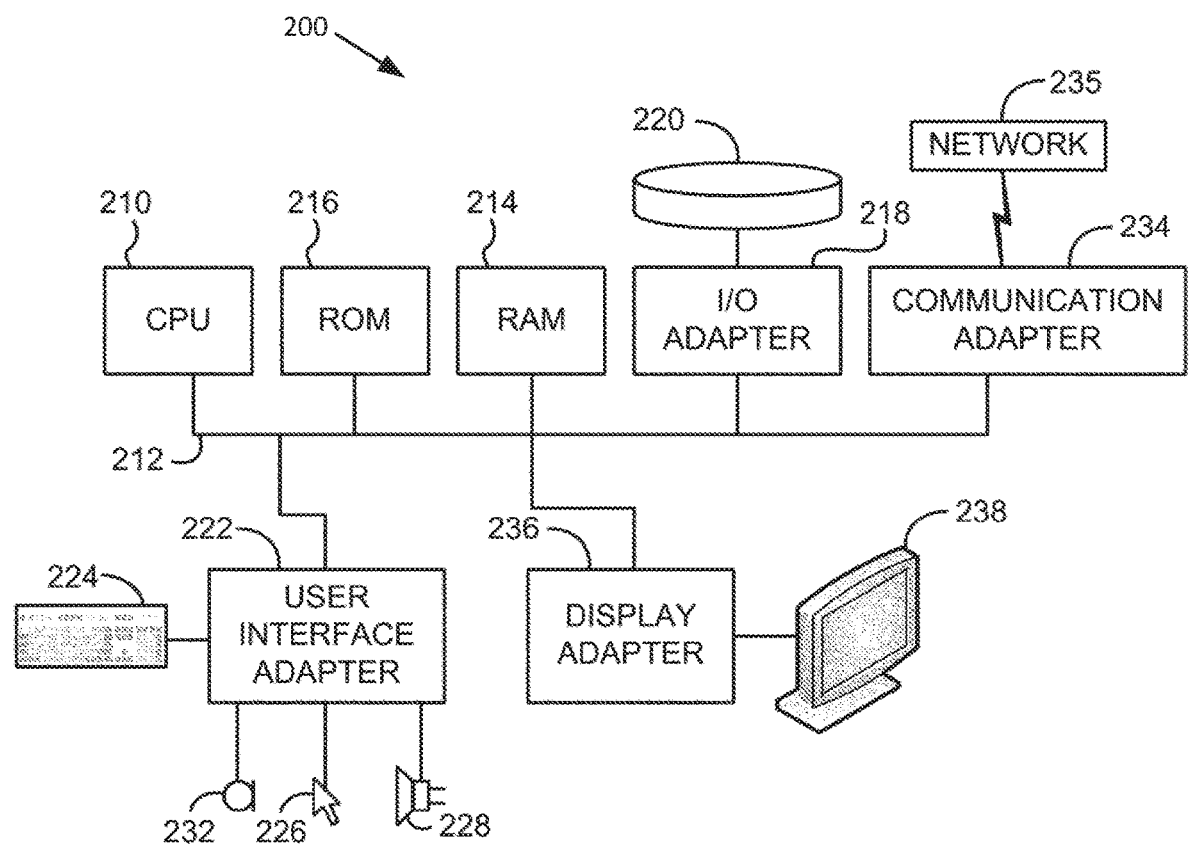
FIG. 2 is a functional block diagram illustrating a data processing or information handling system, according to an embodiment of the present disclosure.

FIG. 2 shows a representative hardware environment associated with a user device 116 and/or server 114 of FIG. 1, in accordance with an embodiment. Such figure illustrates an example hardware configuration of a workstation 200 having a central processing unit 210, such as a microprocessor, and a number of other units interconnected via a system bus 212.

The workstation 200 shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), MAC OS, UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
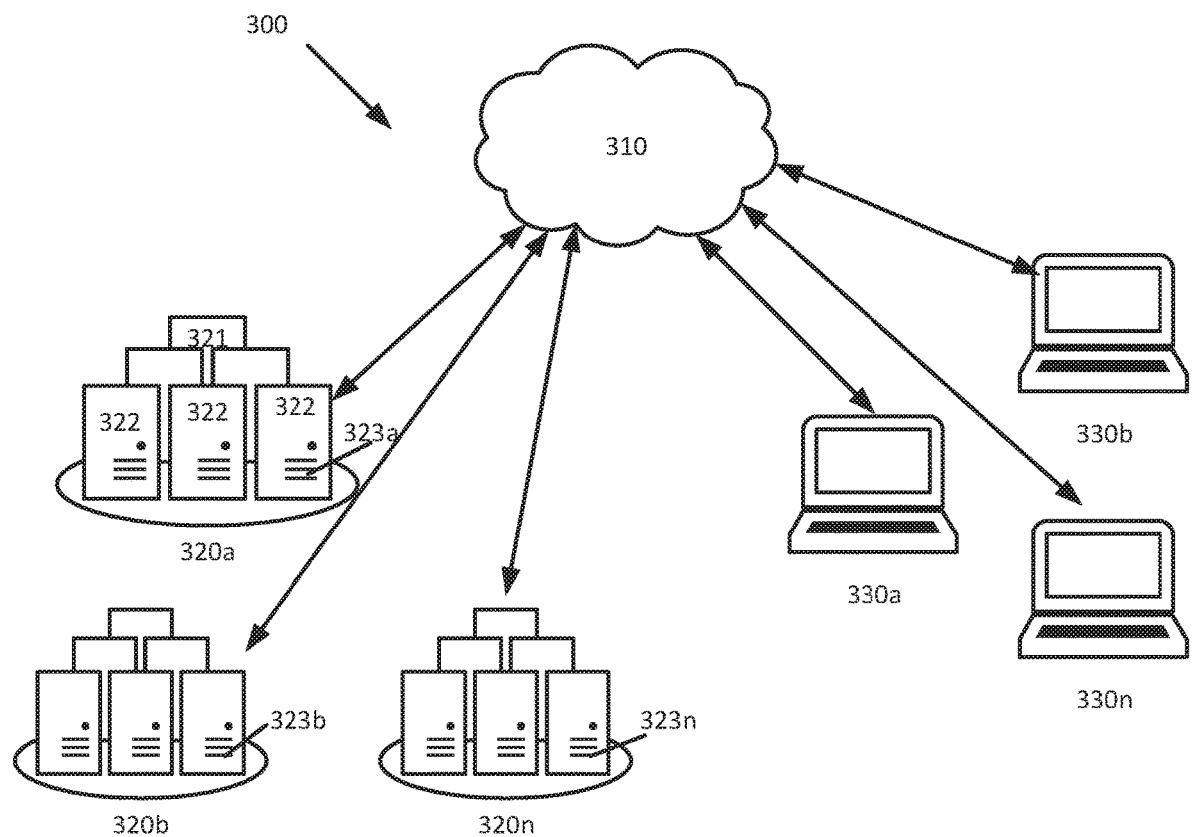
FIG. 3 depicts an example block diagram of an information and data storage/management system, according to an embodiment of the present disclosure.

Referring now to FIG. 3, there is illustrated an example block diagram of an information management system 300 that includes a set of networked data storage systems 320a, 320b . . . 320n and client devices 330a, 330b . . . 330n in communication via a data network 310 and in accordance with implementations of this disclosure. It can be appreciated that the implementations disclosed herein are not limited by the number of storage devices or data storage systems attached to data network 310. It can be further appreciated that storage devices or data storage systems attached to data network 310 are not limited by communication protocols, storage environment, physical location, etc.

In one embodiment, each data storage system 320a, 320b . . . 320n may include a storage subsystem 321 and storage devices 322. The storage subsystem 321 may comprise a storage server or an enterprise storage server, such as the IBM Enterprise Storage Server®. (IBM and Enterprise Storage Server are registered trademarks of IBM). The storage devices 322 may comprise storage systems known in the art, such as a Direct Access Storage Device (DASD), Just a Bunch of Disks (JBOD), a Redundant Array of Independent Disks (RAID), a virtualization device, tape storage, optical disk storage, or any other data storage system. In certain embodiments, multiple storage subsystems may be implemented in one storage subsystem 321 and storage devices 322, or one storage subsystem may be implemented with one or more storage subsystems having attached storage devices. In an embodiment, data and metadata corresponding to contents of the storage systems 320a, 320b . . . 320n is collected and stored. Other types of information that generally provides insights into the contents of the storage systems 320a, 320b . . . 320n can also be stored.

In certain embodiments, client devices 330a, 330b . . . 330n may be general purpose computers having a plurality of components. These components may include a central processing unit (CPU), main memory, I/O devices, and data storage devices (for example, flash memory, hard drives and others). The main memory may be coupled to the CPU via a system bus or a local memory bus. The main memory may be used to provide the CPU access to data and/or program information that is stored in main memory at execution time. Typically, the main memory is composed of random access memory (RAM) circuits. A computer system with a CPU and main memory is often referred to as a host system. The client devices 330a, 330b . . . 330n can have at least one operating system (e.g., Microsoft Windows, Mac OS X, iOS, IBM z/OS, Linux, other Unix-based operating systems, etc.) installed thereon, which may support or host one or more file systems and other applications.

The data storage systems 320a, 320b . . . 320n and client devices 330a, 330b . . . 330n communicate according to well-known protocols, such as the Network File System (NFS) or the Common Internet File System (CIFS) protocols, to make content stored on data storage systems 320a, 320b . . . 320n appear to users and/or application programs as though the content were stored locally on the client systems 330a, 330b . . . 330n. In a typical mode of operation, the client devices 330a, 330b . . . 330n transmit one or more input/output commands, such as an NFS or CIFS request, over the computer network 310 to the data storage systems 320a, 320b . . . 320n, which in turn issues an NFS or CIFS response containing the requested content over the network 310 to the respective client devices 330a, 330b . . . 330n.

The client devices 330a, 330b . . . 330n may execute (internally and/or externally) one or more applications, which generate and manipulate the content on the one or more data storage systems 320a, 320b . . . 320n. The applications generally facilitate the operations of an organization (or multiple affiliated organizations), and can include, without limitation, mail server applications (e.g., Microsoft Exchange Server), file server applications, mail client applications (e.g., Microsoft Exchange Client), database applications (e.g., SQL, Oracle, SAP, Lotus Notes Database), word processing applications (e.g., Microsoft Word), spreadsheet applications(Microsoft Excel), financial applications, presentation applications, browser applications, mobile applications, entertainment applications, and so on. The applications may also have the ability to access (e.g., read and write to) data storage systems 320a, 320b . . . 320n using a network file system protocol such as NFS or CIFS. Other programs and applications may facilitate analytical processing of data such as Spark DataFrames and Pandas DataFrames.

As shown, the data storage systems 320a, 320b . . . 320n, the client devices 330a, 330b . . . 330n, and other components in the information management system 300 can be connected to one another via a communication network 310. The communication network 310 can include one or more networks or other connection types including any of following, without limitation: the Internet, a wide area network (WAN), a local area network (LAN), a Storage Area Network (SAN), a Fibre Channel connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, a neural network, a mesh network, an ad hoc network, other appropriate wired, wireless, or partially wired/wireless computer or telecommunications networks, combinations of the same or the like. The communication network 310 in some cases may also include application programming interfaces (APIs) including, e.g., cloud service provider APIs, virtual machine management APIs, and hosted service provider APIs.

Figure 4:
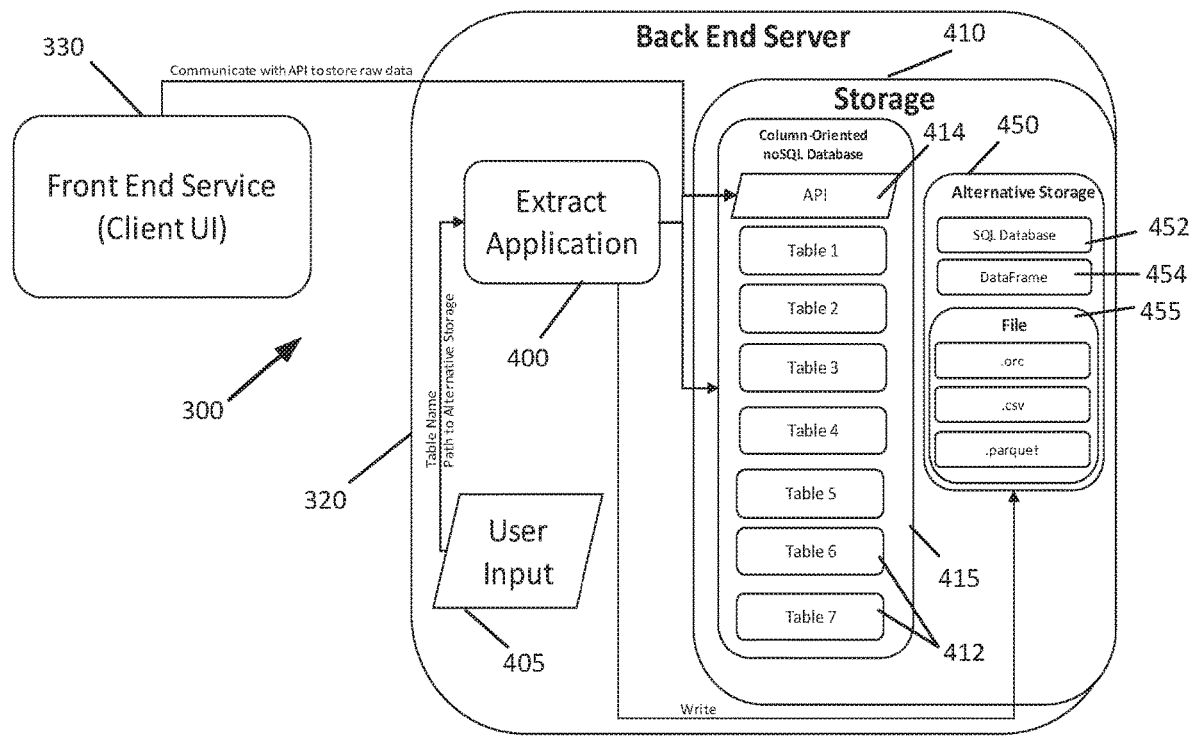
FIG. 4 is a diagrammatic illustration of an information system having an extraction application according to an embodiment of the present disclosure.

Referring to FIG. 4, an embodiment of an information handling system 300 having a client device 330, also referred to as Front End Service 330, and a back end Server 320 is illustrated. The back end Server 320 includes extract application 400 and storage 410. The client device 310 is a client UI (user interface) that communicates with the API of the server 320 to store data on the back end server 320. Storage 410 on server 320 in one or more embodiments includes a Column-Oriented NoSQL database 415, e.g., HBase, that stores data as column-oriented tables 412. More specifically, Column-Oriented NoSQL database 415 includes API 414 and a plurality of tables 412. While only seven (7) tables 412 are shown in FIG. 4, it can be appreciated that column-oriented NoSQL database 415 can host one to many more tables, and each table could be large with millions and even billions of rows with potentially millions of columns of data. The system 300 can be run across a cluster of user devices 330 comprising commodity hardware. In addition to Column-Oriented NoSQL database 415, it can be appreciated that server 320 and storage 410 can include other NoSQL databases (not shown). Also, it is likely that alternative storage 450 is included on Server 320 in storage 410. Alternative storage 450 can include SQL database 452, and DataFrames 454, such as for example Spark DataFrames, as well as file storage 455, such as, for example, flat file storage, for example, .orc files, .csv files, or .parquet files.

Figure 5:
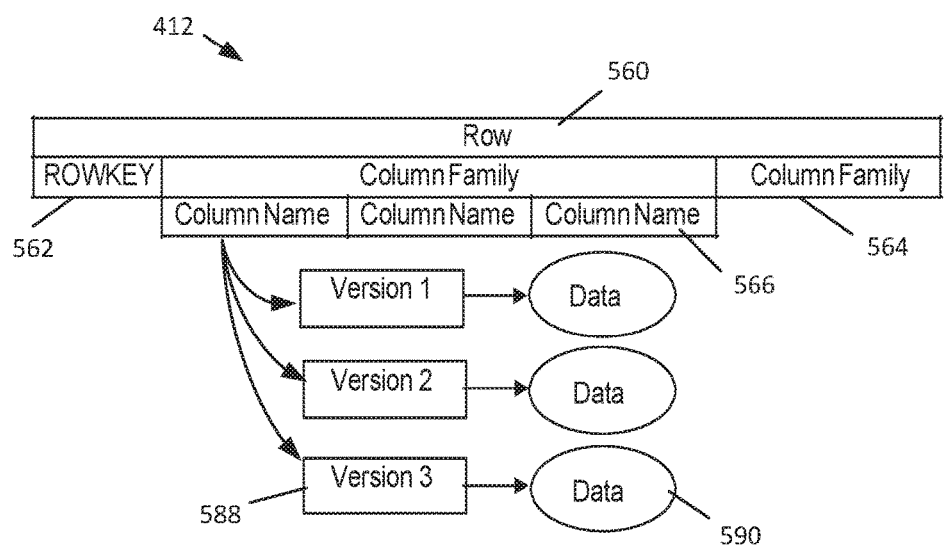
FIG. 5 is a diagrammatic illustration of a row of data in a column-oriented NoSQL database according to an embodiment of the present disclosure.

Column-oriented NoSQL database 415, e.g., HBase, typically has many tables 412 and each table contains many rows of data, where each row has a number of columns that can vary per row. FIG. 5 provides a diagrammatic example of a row 560 of data 590 in table 412 in column-oriented NoSQL database 415. Each row 560 of data includes a unique row key 562 that uniquely identifies each row 560 of data. Typically the row key 562 does not have a data type and is treated internally as a byte array. Data 590 inside each row 560 is organized into Column Families 564 and each Column Family 564 can have one or more column qualifiers 566, also referred to as column names 566. The column names 566 further qualify the Column Family 564, and are the actual columns in the row 560. In one or more embodiments, each row 560 has the same set of Column Families 564, but across rows, the same Column Families 564 do not need or have the same column qualifiers or names 566. An individual row 560 in table 412 is accessible through its row key 562 and is composed of one or more Column families 564. Each column family 564 can have one or more column qualifiers or names 566, and in one or more embodiments, each column name 566 can have one or more versions 588. This format and arrangement of data in column-oriented NoSQL database 415 is relatively easy to implement but is not very useful in the format that it is stored and easily available. The data 590 often requires heavy and costly operations to massage it into a format that would be easy to use, for data analytics, for example. The format and configuration of data in column-oriented NoSQL databases is not compatible or useful to other types of storage (SQL database, flat files, Spark DataFrames). For example, the data format and configuration is not compatible with data analytic programs and applications, such as, for example, Spark DataFrames which provides operations to filter, group, and compute aggregates.

Extraction application 400 provides a system and method to extract tables from column-oriented NoSQL databases, e.g., HBase, to other databases, such as for example, SQL databases, Spark or Pandas DataFrames, or flat file systems. In one or more embodiments, extraction application 400 can create, preferably dynamically create, schema for the data, e.g., tables, extracted from the column-oriented NoSQL database. In one or more embodiments, extraction application 400 dynamically collects the schema associated with the tables extracted from the column-oriented SQL database, and in an aspect efficiently extracts the full table from the column-oriented database. In a further aspect, the extract application 400 can incrementally collect only updated and/or new rows from the desired table without extracting the entire table from the column-oriented NoSQL database. In an aspect, the extract application 400 can track the last table extract via a timestamp saved with the data in the table extract so future extractions of the same table only extract new and/or updated rows. The extraction application 400 typically can execute on the same hardware that operates storage 410, and for example can be one or more of servers 114, workstation 200, and/or storage system 320. In one or more embodiments, the extraction application 400 is configured and adapted to extract data tables from HBase and format the tables in flat files stored on alternative storage, and in one or more aspects, the extraction application 400, or portions thereof, is written in Scala in which case an instance of Apache Spark or similar program is installed on Server 320.

Extraction application 400 as shown in FIG. 4 receives input from a user as illustrated by User Input 405 in FIG. 4. Extraction application 400 with input from User Input 405 interfaces with Column-Oriented NoSQL database 415 to extract desired or requested data from database 415, e.g., from tables 412 in database 415, and creates schema for the NoSQL data/tables extracted from the column-oriented NoSQL database 415 and writes or saves the extracted data/table to alternative storage 450. In an aspect extraction application 400 preferably writes the data extracted from NoSQL database 415 in a format compatible with the data storage format of alternative storage 450. The extraction application 400 provides for a full extraction system and/or process from NoSQL database 415 to alternative storage 450 in a different format, and optionally an incremental extraction system and/or process from NoSQL database 415 to alternative storage 450 in a different format to increase efficiency.

Figure 6:
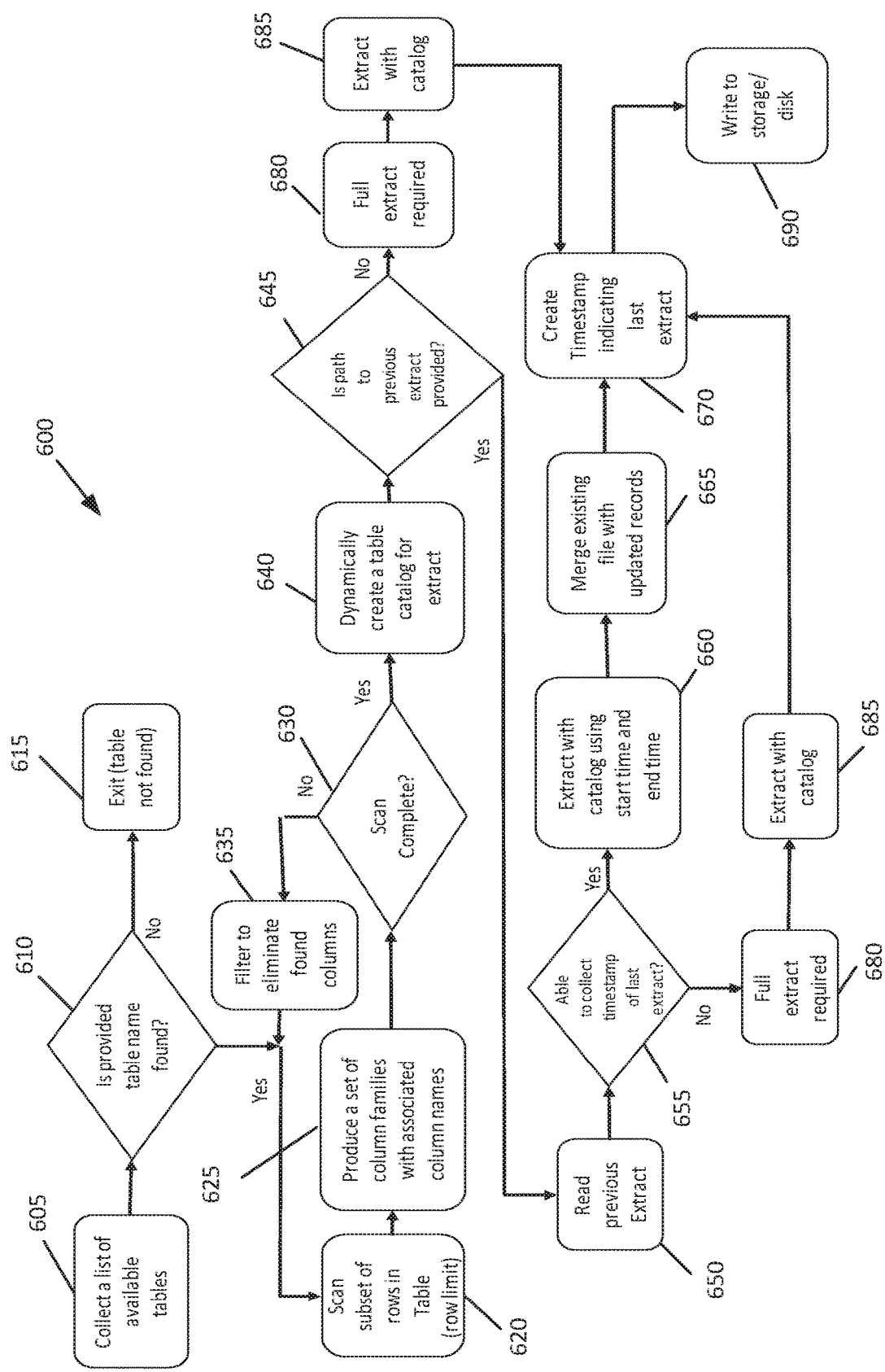
FIG. 6 is an example embodiment of a flow chart illustrating a method and technique of extracting data from a column-oriented NoSQL database.

Referring now to FIG. 6, an exemplary flowchart in accordance with one or more embodiments illustrating and describing a method of extracting data, preferably a desired table from a database, e.g., from a NoSQL database, preferably a column-oriented NoSQL database, to an alternative database, preferable in an alternative, different format, e.g., as flat files, is disclosed. While the method 600 shown in FIG. 6 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 6, but the process may be integrated and/or one or more steps may be performed together, simultaneously, or the steps may be performed in the order disclosed or in an alternate order, unless indicated otherwise.

A user through User Input 405 provides a table name for which data is to be extracted, referred to as the desired table or designated table, and in an aspect provides a path to the alternative storage 450 that the data is to be written to Extraction Application 400. The path provided by User Input 405 indicates to the Extraction Application 400 the desired format of the data to be output by the Extraction Application 400 and written to Alternative Storage 450. That is, the user specifies the extension of the file to determine how the data is written out of the Extraction Application 400 to the Alternative Storage at 450. At 605, the Extraction Application 400 collects a list of available tables 412 in the Column-Oriented NoSQL database 415, and at 610 it is determined whether or not the Table name provided by the user for extraction is found among the tables 412 in the Column-Oriented NoSQL database 415. That is, in an embodiment, a list of the tables 412 in the NoSQL database 415 is collected and checked to determine if the desired table, e.g., data, to be extracted is located in the NoSQL database 415. It can be appreciated that there could be alternative mechanisms and processes to check whether or not the NoSQL database 415 contains the desired table and/or data, and steps 605 and 610 could be optional. If at 610 it is determined that the desired table is not located in the NoSQL database 415 (610: No), then at 615 the process 600 is terminated and/or exited.

If at 610 it is determined that the desired table, the table provided as input and also referred to as the designated table, is located in the NoSQL database 415 (610: Yes), then at 620 a subset of the rows in the designated table are scanned. The subset or number of rows scanned at 620 can be predetermined, programmable, and/or varied depending upon various factors. For example, the number or subset of rows scanned at 620 could depend upon and be configurable based upon the number of rows in the designated table. Additionally, or alternatively, the number or subset of rows can be predetermined to be a set number of rows, for example, the next 100 rows. It can be appreciated that in an embodiment all the rows in the designated table can be scanned all at once, i.e., no subset of rows are scanned, or a single row at a time could be scanned. At 625 the column families and column qualifiers (column names) are collected. It can be appreciated that the column families and column names can be collected during or after the scanning of the subset of rows at 620. At 630 it is determined whether the scan, i.e., the scanning of column families and columns, is complete.

If at 630 the scan is not complete (630: No), then the process 600 performs a loop and goes back to 620 where another subset of rows in the desired table is scanned. Optionally, as part of the loop back to 620 for another scan of rows of the desired table, at 635 a filter is built and/or applied to eliminate columns that are already found, e.g., columns already collected and identified in the earlier scan, to eliminate redundancy. If the process 600 performs a further scan of a subset of rows in the table at 620, then at 625 the additional column families and column names are collected. In the embodiment where the optional filter is applied at 635, the collected column families and column names are filtered to eliminate columns that are already collected. In an embodiment, the filter is applied during the scan of the next subset of rows so that the column names already collected are not scanned or read. In this manner, the filter eliminates the work involved in scanning columns already collected and identified and makes the process more efficient. The process 600, after scanning the next subset of rows and collecting column families and columns, again continues to 630 where it is determined whether or not the scan is complete. The process 600 keeps looping back to 620 to scan the next subset of rows, and optionally applying the filter to eliminate columns already collected, until the scan is complete at 630.

When the scan is complete (630: Yes), the process continues to 640 where a Java Script Object Notation (JSON) structure is created, preferably dynamically created, to extract the columns in each column family to create a table catalog for the new table to which the data is to be extracted. For example, each of the columns and column families to which the columns are associated with are scanned, read, reviewed and/or ingested, and a unique JSON structure is built that will extract the columns that were collected to one or more new column names that have been defined by the JSON structure. In one or more embodiments, only new column names are created for the columns within the NoSQL table when the collected column names contain characters that will be determined to be invalid, such as for example if there is a period "." within a column name. If the column name in the desired table that is being extracted from the NoSQL database, e.g., NoSQL database 415, contains no characters that will corrupt the data when being extracted, then no alterations are made to the column name. Each JSON structure that is built differs from table to table as the number of column families and column names is different for each table in the NoSQL database 415. At 640 the process builds the schema for the new table in alternative storage 450 to which the data from the desired table in the NoSQL database 415 will be extracted.

After 640 where the table catalog for the data extract is built/created, it is determined at 645 whether a previous extract of the desired table was performed. At user input 405 to the extraction application 400 the user provided a location in alternative storage 450 where the desired table, e.g., the desired data, is to be written. In an embodiment, at 645 the location in the alternative storage 450 where the extract data is to be written is checked to see if any information, e.g., any previous extract of the desired table, already exists. If at 645 a previous extract of the desired table already exists (645: Yes), then the previous extract is read from alternative storage 450 (from the location provided by the user) at 650 and an incremental extract from NoSQL database 415 to be described is performed. If a previous extract of the desired table does not exist in the alternative database 450 (645: No), or if a timestamp from the previous extract of the desired table does not exist (655: No), then a full data extract from NoSQL database 415 will be required as will be described.

More specifically, at 645 it is determined whether a previous extract of the desired table exists in alternative storage 450, and if it is determined at 645 that a previous extract of the desired table does not exist in alternative storage (645: No), or if the location is invalid or does not exist (645: No), then the process proceeds to 680 where a full table extract from NoSQL database 415 is required. If on the other hand, a previous extract of the desired table exists (645: Yes), then at 650 the previously extracted table from alternative storage 450 will be read at 650. After 650 the process proceeds to 655 where it is determined whether there is a timestamp for the previously extracted table read from alternative storage 450. That is, at 655 it is determined whether a timestamp was collected (and/or valid) for the desired table previously extracted to and read from alternative storage 450, and if a time stamp was not collected, and/or is invalid (655: No), and/or the previously extracted table could not be read, then the process 600 continues to 680 where a full extract is required.

Turning to the process 600 at 680 where a full extract is required, at 685 the data from the desired table, and specifically the data in all the columns identified and collected during the one or more scans in 620 through 635, will be read and extracted into the table catalog created during 640. That is, at 685 the extract reads all the data in the collected columns from the desired table in the NoSQL database 415 from start up to the time of the present extraction process 600. In one or more embodiments, the data 590 is extracted from the columns 566 and the data is formatted as per the new columns of the new table as determined by the schema built and developed in 640, and preferably by the JSON structure of 640. After 685 where the full table extract is performed, the process 600 continues to 670 where the create timestamp is associated with the table extract performed at 685, e.g., associated with, appended to, and/or saved with the extracted table. After the timestamp is appended or associated with the table extract at 670, the table extract (and timestamp) at 690 is saved and/or written to Alternative Storage 450 in the location specified by the path provided by the user at the outset of process 600. Depending upon whether an extract of the table already exists in Alternative Storage 450, at 690 the extract process will write and save all the data extracted from the NoSQL table 415 to Alternative Storage 450, or overwrite and save all of the data extracted from the NoSQL table 415 to Alternative Storage 450.

Turning to the process 600 at 655 (the incremental extract process), if at 655 a timestamp of the last data extract can be read and/or collected (655: Yes), then the process 600 proceeds to 660 where an incremental extract is performed using the timestamp of the previous data extract. For example, when a data/table extract is performed a timestamp is associated with and saved with the extract as indicated at 670. At 660 reference is made to the timestamp associated with the previous data/table extract and only new data is collected, e.g., data created after the timestamp associated with the extracted table/data. At 660 all data from the desired table in NoSQL database 415, between the last data extract (as determined by the associated timestamp) and the current data extract operations, is extracted. That is, in an aspect the timestamp of the last extract is isolated and used as the starting timestamp for the current extract operations. At 660, if the data 590 in the column 566 of a row 562 in the desired NoSQL table 412 has a timestamp that is after, i.e., later in time, the timestamp isolated from the previous table extract, then the data 590 in the column 566 of NoSQL table 412 is extracted to the new table structure created at 640, whereas if the data 590 in the column 566 of the desired NoSQL table 412 has a timestamp before, earlier in time, the timestamp isolated from the previous table extract, then the data 590 in the column 566 of NoSQL table 412 is not extracted to the new table catalog structure. In one or more embodiments, the data 590 is extracted from the columns 566 and the data is formatted as per the new columns of the new table as determined by the schema built and developed in 640, and preferably by the JSON structure of 640.

At 655 the newly extracted data is merged with the previous extracted data. That is, in an embodiment, at 655 new rows are added to the previous extract, and existing rows are updated. At 670 the data extract timestamp is updated to bear the timestamp of the current extract operations. At 690 the extract is written and/or saved to storage or disk, and in one or more aspects is written and/or saved to the location in Alternative Storage 450 designated by the user (part of the User Input 405 into the extraction application 400). It will be appreciated that the incremental update of 660-655 is optionally implemented and adds efficiency to the extraction process and operations by not processing rows and data previously processed and extracted into a form compatible with the desired alternative storage format.

It will further be appreciated, that the format of the data/table extract stored in Alternative Storage 450 is typically a flat file (files with .csv, .orc, .parquet file extensions). In one or more embodiments, the user by specifying the path to alternative storage specifies the extension of the file which determines how the data is written out. The extraction process 600 could be extended to implement or use SQL databases on writes to alternative storage 450 through additional user input using java database connectivity (JDBC options) within the extraction application 400.

While illustrative embodiments described above can be implemented in hardware, such as in units and circuitry of a processor, various aspects of the illustrative embodiments are implemented in software. For example, it will be understood that each block of the flowchart illustration in FIG. 6, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions, and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

One or more embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

The corresponding structures, materials, acts, and equivalents of all means or step plus function elements in the claims below are intended to include any structure, material, or act for performing the function in combination with other claimed elements as specifically claimed. The description of the embodiments of the present disclosure has been presented for purposes of illustration and description, but is not intended to be exhaustive or limited to the embodiments in the form disclosed. Many modifications and variations will be apparent to those of ordinary skill in the art without departing from the scope and spirit of the disclosure. The embodiments and examples were chosen and described in order to best explain the principles of the disclosure and the practical application, and to enable others of ordinary skill in the art to understand the disclosure for various embodiments with various modifications as are suited to the particular use contemplated.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

It will be clear that the various features of the foregoing systems and/or methodologies may be combined in any way, creating a plurality of combinations from the descriptions presented above.

It will be further appreciated that embodiments of the present disclosure may be provided in the form of a service deployed on behalf of a customer to offer service on demand.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of extracting a table having data in a plurality of rows from a column-oriented Not Only Structured Query Language (NoSQL) database and saving at least a portion of the extracted data to a new table created in a different type of database, the method comprising:
    scanning all the rows in a desired table in the NoSQL database and producing a list of column families and associated column names;
    creating, in response to scanning all the rows in a desired table in the NoSQL data base and producing the list of column families and column names, a schema for a new table having a table catalog of new column names using a Java Script Object Notation (JSON) structure to extract the columns names from the list of column families produced by scanning all the rows in the desired table in the NoSQL database;
    reading and extracting, after creating the schema for the new table having the table catalog of new column names, at least a portion of the data from the desired table in the NoSQL database;
    placing the at least a portion of the data extracted from the desired table in the NoSQL database into the new table having the table catalog of new columns names;
    associating a creation timestamp with the new table; and
    saving the new table having the table catalog of new column names with the at least a portion of the data placed into the new table to the different database with the associated creation timestamp.

2. The method according to claim 1, further comprising providing the desired table name and a path to the different database.

3. The method according to claim 1, wherein scanning all the rows in a desired table and producing a list of family names and associated column names comprises:
    scanning a first subset of the rows in the desired table in the NoSQL database;
    producing a list of column families and associated column names from the scanned subset of rows;
    checking if all the rows in the desired table have been scanned; and
    in response to all the rows in the desired table not being scanned, scanning a second subset of the rows in the desired table in the NoSQL database.

4. The method according to claim 3, further comprising, in response to all the rows in a desired table not being scanned, applying a filter during scanning of the second subset of the rows in the desired table to avoid scanning any column names already scanned.

5. The method according to claim 1, further comprising:
checking if a previous extract of the desired table is present in the different database, and
in response to a previous extract of the desired table not being present in the different database, reading and extracting all the data from the desired table in the NoSQL database into the new table having the table catalog of new columns names.

6. The method according to claim 5, wherein checking if a previous extract of the desired table is present in the different database comprises:
determining, from the path to the different database provided by a user, the different database to write the new table; and
in response to determining the different database, search the different database for a previous extract of the desired table.

7. The method according to claim 5, further comprising:
in response to a previous extract of the desired table being present in the different database, determining whether the creation timestamp associated with the previous extract of the desired table is available; and
in response to the creation timestamp associated with the previous extract of the desired table not being available, reading and extracting all the data from the desired table in the NoSQL database into the new table having the table catalog of new columns names.

8. The method according to claim 7, further comprising in response to the creation timestamp associated with the previous extract of the desired table being available, reading and extracting all the data after the creation timestamp from the desired table in the NoSQL database into the new table having the table catalog of new columns names.

9. The method according to claim 8, further comprising merging the data extracted from the NoSQL database after the creation timestamp with the previous extract of the desired table to add new rows and update existing rows from the previous extract.

10. The method according to claim 9, further comprising updating the creation timestamp associated with the new table having the merged data and saving the new table with the merged data to the different database.

11. The method according to claim 1, wherein the column-oriented NoSQL database is HBase, and the new table is a flat file written to alternative storage.

12. A computer program product for extracting a table having data in a plurality of rows from a column-oriented Not Only Structured Query Language (NoSQL) database and saving at least a portion of the extracted data to a new table created in a different type of database, the computer program product comprising a machine readable medium storing instructions that, when executed by at least one programmable processor, cause the at least one programmable processor to perform operations comprising:
scanning all the rows in a desired table in the NoSQL database and producing a list of column families and associated column names;
creating, in response to scanning all the rows in a desired table in the NoSQL data base and producing the list of column families and column names, a schema for a new table having a table catalog of new column names using a Java Script Object Notation (JSON) structure to extract the columns names from the list of column families produced by scanning all the rows in the desired table in the NoSQL database;
reading and extracting, after creating the schema for the new table having the table catalog of new column names, at least a portion of the data from the desired table in the NoSQL database;
placing the at least a portion of the data extracted from the desired table in the NoSQL database into the new table having the table catalog of new columns names;
associating a creation timestamp with the new table; and
saving the new table having the table catalog of new column names with the at least a portion of the data placed into the new table to the different database with the associated creation timestamp.

13. The computer program product according to claim 12, further comprising instructions that, when executed by the at least one programmable processor, cause the at least one programmable processor to perform operations comprising:
scanning a first subset of the rows in the desired table in the NoSQL database;
producing a list of column families and associated column names from the scanned subset of rows;
checking if all the rows in the desired table have been scanned; and
in response to all the rows in the desired table not being scanned, scanning a second subset of the rows in the desired table in the NoSQL database.

14. The computer program product according to claim 13, further comprising instructions that, when executed by the at least one programmable processor, cause the at least one programmable processor to perform operations comprising:
in response to all the rows in a desired table not being scanned, applying a filter during scanning of the second subset of the rows in the desired table to avoid scanning any column names already scanned.

15. The computer program product according to claim 12, further comprising instructions that, when executed by the at least one programmable processor, cause the at least one programmable processor to perform operations comprising:
checking if a previous extract of the desired table is present in the different database, and
in response to a previous extract of the desired table not being present in the different database, reading and extracting all the data from the desired table in the NoSQL database into the new table having the table catalog of new columns names.

16. The computer program product according to claim 15, further comprising instructions that, when executed by the at least one programmable processor, cause the at least one programmable processor to perform operations comprising:
in response to a previous extract of the desired table being present in the different database, determining whether the creation timestamp associated with the previous extract of the desired table is available; and
in response to the creation timestamp associated with the previous extract of the desired table not being available, reading and extracting all the data from the desired table in the NoSQL database into the new table having the table catalog of new columns names.

17. The computer program product according to claim 16, further comprising instructions that, when executed by the at least one programmable processor, cause the at least one programmable processor to perform operations comprising:
in response to the creation timestamp associated with the previous extract of the desired table being available, reading and extracting all the data after the creation timestamp from the desired table in the NoSQL database into the new table having the table catalog of new columns names.

18. The computer program product according to claim 17, further comprising instructions that, when executed by the at least one programmable processor, cause the at least one programmable processor to perform operations comprising:

merging the data extracted from the NoSQL database after the creation timestamp with the previous extract of the desired table to add new rows and update existing rows from the previous extract.

19. The computer program product according to claim 18, further comprising instructions that, when executed by the at least one programmable processor, cause the at least one programmable processor to perform operations comprising:

updating the timestamp associated with the new table having the merged data and saving the new table with the merged data to the different database.

20. A system comprising:

at least one programmable processor;

a column-oriented Not Only Structured Query Language (NoSQL) database comprising a plurality of tables storing data, each table having one or more rows, wherein each row has a row key, and one or more column families, each column family having one or more column names wherein each column name is associated with stored data where the stored data in each column name has a timestamp associated with the stored data;

at least one alternative storage database comprising flat files;

a machine-readable medium storing instructions that, when executed by the at least one programmable processor, cause the at least one programmable processor to perform operations comprising:

scanning all the rows in a desired table in the NoSQL database and producing a list of the one or more column families and associated column names;

creating, in response to scanning all the rows in a desired table in the NoSQL data base and producing the list of column families and column names, a schema for a new table having a table catalog of new column names using a Java Script Object Notation (JSON) structure to extract the columns names from the list of column families produced by scanning all the rows in the desired table in the NoSQL database;

reading and extracting, after creating the schema for the new table having the table catalog of new column names, at least a portion of the data from the desired table in the NoSQL database;

placing the at least a portion of the data extracted from the desired table in the NoSQL database into the new table having the table catalog of new columns names;

associating a creation timestamp with the data in the new table; and saving the new table having the table catalog of new column names with the at least a portion of the data placed into the new table to the alternative storage database with the associated creation timestamp.

* * * * *